US011956757B2

(12) United States Patent
Gulati et al.

(10) Patent No.: US 11,956,757 B2
(45) Date of Patent: *Apr. 9, 2024

(54) AUTONOMOUS RESOURCE SELECTION FOR MULTIPLE TRANSMISSIONS IN DEVICE-TO-DEVICE COMMUNICATIONS

(71) Applicant: QUALCOMM Incorporated, San Diego, CA (US)

(72) Inventors: Kapil Gulati, Hillsborough, NJ (US); Sudhir Kumar Baghel, Hillsborough, NJ (US); Shailesh Patil, San Diego, CA (US); Tien Viet Nguyen, Bridgewater, NJ (US); Zhibin Wu, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/830,072

(22) Filed: Mar. 25, 2020

(65) Prior Publication Data

US 2020/0229146 A1 Jul. 16, 2020

Related U.S. Application Data

(63) Continuation of application No. 15/680,014, filed on Aug. 17, 2017, now Pat. No. 10,631,271.
(Continued)

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/23* (2023.01); *H04W 72/51* (2023.01)

(58) Field of Classification Search
CPC ............... H04W 72/048; H04W 72/02; H04W 72/0446; H04W 72/1289
See application file for complete search history.

(56) References Cited

U.S. PATENT DOCUMENTS

| 10,039,070 B2 | 7/2018 | Lee et al. | |
|---|---|---|---|
| 2012/0324041 A1* | 12/2012 | Gerber | H04L 67/26 709/217 |

(Continued)

FOREIGN PATENT DOCUMENTS

| CN | 104170414 A | 11/2014 |
|---|---|---|
| CN | 105191178 A | 12/2015 |

(Continued)

OTHER PUBLICATIONS

LG Electronics: "Resource Selection Details for UE Autonomous Resource Selection Mode in PC5-based V2V", R1-166826, 3GPP TSG RAN WG1 Meeting #86, Gothenburg, Sweden Aug. 22-26, 2016, pp. 1-4.

(Continued)

*Primary Examiner* — Syed Ali
(74) *Attorney, Agent, or Firm* — Holland & Hart LLP

(57) ABSTRACT

A user equipment (UE) may communicate with one or more other UEs using multiple transmissions in a device-to-device (D2D) communications deployment. A number of UEs may be configured with D2D resources, and a transmitting UE may identify available D2D resources from the configured resources. The transmitting UE may identify a resource for a first transmission of a D2D transmission from the available D2D resources, and may identify a second resource for a second transmission of the D2D transmission. The second transmission may be a blind HARQ transmission that may be transmitted to enhance the likelihood that one or more receiving UEs successfully receive the transmission. In some examples, the second resource may be identified based (Continued)

on other available resources within an predetermined time window around the first transmission.

2 Claims, 11 Drawing Sheets

Related U.S. Application Data

(60) Provisional application No. 62/379,726, filed on Aug. 25, 2016.

(51) Int. Cl.
*H04W 72/23* (2023.01)
*H04W 72/51* (2023.01)

(56) References Cited

U.S. PATENT DOCUMENTS

| | | |
|---|---|---|
| 2014/0056220 A1 | 2/2014 | Poitau et al. |
| 2015/0163689 A1 | 6/2015 | Lee et al. |
| 2015/0271840 A1 | 9/2015 | Tavildar et al. |
| 2016/0044620 A1 | 2/2016 | Bagheri |
| 2016/0212636 A1 | 7/2016 | Dimou et al. |
| 2016/0286601 A1 | 9/2016 | Siomina et al. |
| 2017/0041971 A1 | 2/2017 | Kim et al. |
| 2017/0085461 A1 | 3/2017 | Zhou et al. |
| 2017/0105230 A1 | 4/2017 | Matsumoto et al. |
| 2017/0164396 A1* | 6/2017 | Matsumoto ......... H04W 76/14 |
| 2017/0207968 A1* | 7/2017 | Eicken ................. H04L 67/01 |
| 2017/0230995 A1* | 8/2017 | Kim ...................... H04W 72/23 |
| 2017/0325190 A1 | 11/2017 | Lee et al. |
| 2017/0329647 A1* | 11/2017 | Eda ......................... G06F 3/061 |
| 2018/0063816 A1 | 3/2018 | Gulati et al. |
| 2018/0091936 A1* | 3/2018 | Krzych ................ H04W 64/00 |
| 2018/0098322 A1* | 4/2018 | Yoon ................. H04W 72/0446 |
| 2018/0199375 A1* | 7/2018 | Nezou ................. H04W 74/006 |
| 2018/0206260 A1 | 7/2018 | Khoryaev et al. |
| 2018/0249448 A1 | 8/2018 | Yasukawa et al. |
| 2018/0270776 A1 | 9/2018 | Yasukawa et al. |
| 2018/0302779 A1* | 10/2018 | Fujishiro .............. H04W 72/042 |
| 2019/0014562 A1* | 1/2019 | Yasukawa ............. H04L 5/0048 |
| 2019/0132103 A1* | 5/2019 | Yang ................... H04W 72/121 |
| 2019/0140703 A1* | 5/2019 | Casetti ................ H04W 72/542 |
| 2019/0166572 A1 | 5/2019 | Abraham et al. |
| 2020/0305152 A1* | 9/2020 | Yasukawa ............. H04W 92/18 |

FOREIGN PATENT DOCUMENTS

| | | |
|---|---|---|
| CN | 105659677 A | 6/2016 |
| EP | 3018974 A1 | 5/2016 |
| JP | 2015012591 A | 1/2015 |
| JP | 2016515330 A | 5/2016 |
| JP | 2019531640 A | 10/2019 |
| KR | 20160025452 A | 3/2016 |
| KR | 20160101122 A | 8/2016 |
| WO | WO-2014135122 A1 | 9/2014 |
| WO | WO-2015116865 A1 | 8/2015 |
| WO | WO-2015141727 A1 | 9/2015 |
| WO | WO-2015141728 A1 | 9/2015 |
| WO | WO-2015142429 A1 | 9/2015 |
| WO | WO-2015160197 A1 | 10/2015 |
| WO | WO-2016021930 A1 | 2/2016 |
| WO | WO-2016130072 A1 | 8/2016 |

OTHER PUBLICATIONS

NTT Docomo, Inc: "Further Details of UE Autonomous Resource (re)selection for V2V", R1-167355, 3GPP TSG RAN WG1 Meeting #86, Gothenburg, Sweden Aug. 22-26, 2016, pp. 1-7.

International Preliminary Report on Patentability -PCT/US2017/047657, The International Bureau of WIPO—Geneva, Switzerland, dated Feb. 26, 2019.

International Search Report and Written Opinion—PCT/US2017/047657—ISA/EPO—dated Oct. 30, 2017.

Qualcomm Incorporated: "Resource Allocation for Type 1 D2D Discovery," 3GPP Draft, R1-141967_QC_D2D_DISCOVERY_TYPE1, 3rd Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014, May 18, 2014, XP050789087, 9 pages, Retrieved from the Internet: URL: http://www.3gpp.org/ftp/Meetings_3GPP_SYNC/RAN1/RAN1/Docs/ [retrieved on May 18, 2014].

ASUSTeK, "Discussion of Multiple SA Transmission in Mode 2 D2D Communication", R1-144287, 3GPP TSG RAN WG1 #78bis, Ljubljana, Slovenia, Oct. 6-10, 2014, (Sep. 27, 2014), 3 Pages.

Huawei, et al., "Congestion Control for V2V", R1-166166, 3GPP TSG RAN WG1 #86, Gothenburg, Sweden, Aug. 22-26, 2016 (Aug. 12, 2016), 4 Pages.

Sharp, "Aspects of Resource Pool Configuration for D2D Communication", R2-142141, 3GPP TSG RAN WG2 #86, Seoul, Korea, May 19-23, 2014 (May 9, 2014), 3 Pages.

Lin Q., "A Study of Resource Allocation Techniques in D2D Device Discovery and Communications", Chinese Master's Theses Full-text Database(CMFD), Aug. 15, 2015.

General Dynamics Broadband UK: "ProSe Device-to-Device Discovery Resource Allocation", 3GPP TSG-RAN1#76, R1-140514, Prague, Czech Republic, Feb. 10-14, 2014, 10 Pages.

General Dynamics Broadband UK: "ProSe Device-to-Device Communication Control Channel Design", 3GPP TSG-RAN1#76, R1-140511, Prague, Czech Republic, Feb. 10-14, 2014, 4 Pages.

LG Electronics: "Discussion on Resource Pool Structure and Control Signaling for PC5-based V2V", 3GPP TSG RAN WG1 Meeting #83, R1-156892, Anaheim, USA, Nov. 15-22, 2015, pp. 1-5.

\* cited by examiner

AUTONOMOUS RESOURCE SELECTION FOR MULTIPLE TRANSMISSIONS IN DEVICE-TO-DEVICE COMMUNICATIONS

CROSS REFERENCES

The present Application for Patent is a Continuation of U.S. patent application Ser. No. 15/680,014 by Gulati et al., entitled "Autonomous Resource Selection For Multiple Transmissions In Device-To-Device Communications" filed Aug. 17, 2017, which claims priority to U.S. Provisional Patent Application No. 62/379,726 by Gulati, et al., entitled "Autonomous Resource Selection For Multiple Transmissions in Device-To-Device Communications," filed Aug. 25, 2016, assigned to the assignee hereof.

BACKGROUND

The following relates generally to wireless communication, and more specifically to autonomous resource selection for multiple transmissions in device-to-device (D2D) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology. A wireless multiple-access communications system (including an LTE system) may include a number of base stations, each supporting communication for multiple communication devices, which may be otherwise known as user equipment (UE).

Some wireless systems may support D2D communication, which may enable UEs to communicate directly with each other without an intermediate connection to a central node, such as a base station. In some cases, the UEs may send control and data transmissions to each other. In some cases, UEs may transmit to multiple other UEs, such as a UE associated with vehicle control that may transmit information to multiple other vehicles that may be within relatively close proximity.

SUMMARY

A user equipment (UE) may communicate with one or more other UEs using multiple transmissions in a device-to-device (D2D) communications deployment. A number of UEs may be configured with D2D resources, and a transmitting UE may identify available D2D resources from the configured resources (e.g., based on scheduling assignment (SA) information of one or more other UEs). The transmitting UE may identify a resource for a first transmission of a D2D transmission from the available D2D resources, and may identify a second resource for a second transmission of the D2D transmission. The second transmission may be, for example, a blind hybrid acknowledgment receipt request (HARD) transmission that may be transmitted to enhance the likelihood that one or more receiving UEs successfully receive the transmission. In some examples, the second resource may be identified based on other available resources within an predetermined time window around the first transmission.

A method of wireless communication is described. The method may include identifying a candidate set of resources within a set of available resources for transmitting a D2D transmission, selecting a first resource within the candidate set of resources for transmitting a first transmission of the D2D transmission, determining a subset of the set of available resources for transmitting a second transmission of the D2D transmission, selecting a second resource within the subset of the set of available resources for transmitting the second transmission, transmitting the first transmission using the first resource, and transmitting the second transmission using the second resource.

An apparatus for wireless communication is described. The apparatus may include means for identifying a candidate set of resources within a set of available resources for transmitting a D2D transmission, means for selecting a first resource within the candidate set of resources for transmitting a first transmission of the D2D transmission, means for determining a subset of the set of available resources for transmitting a second transmission of the D2D transmission, means for selecting a second resource within the subset of the set of available resources for transmitting the second transmission, means for transmitting the first transmission using the first resource, and means for transmitting the second transmission using the second resource.

Another apparatus for wireless communication is described. The apparatus may include a processor, memory in electronic communication with the processor, and instructions stored in the memory. The instructions may be operable to cause the processor to identify a candidate set of resources within a set of available resources for transmitting a D2D transmission, select a first resource within the candidate set of resources for transmitting a first transmission of the D2D transmission, determine a subset of the set of available resources for transmitting a second transmission of the D2D transmission, select a second resource within the subset of the set of available resources for transmitting the second transmission, transmit the first transmission using the first resource, and transmit the second transmission using the second resource.

A non-transitory computer readable medium for wireless communication is described. The non-transitory computer-readable medium may include instructions operable to cause a processor to identify a candidate set of resources within a set of available resources for transmitting a D2D transmission, select a first resource within the candidate set of resources for transmitting a first transmission of the D2D transmission, determine a subset of the set of available resources for transmitting a second transmission of the D2D transmission, select a second resource within the subset of the set of available resources for transmitting the second transmission, transmit the first transmission using the first resource, and transmit the second transmission using the second resource.

In some examples of the method, apparatus, and non-transitory computer-readable medium described above, the determining the subset of the set of available resources comprises determining remaining resources of the candidate set of resources based at least in part on removing the first resource from the candidate set of resources.

In some examples of the method, apparatus, and non-transitory computer-readable medium described above, the determining the subset of the set of available resources further comprises identifying a first time for transmitting the first transmission. Some examples of the method, apparatus, and non-transitory computer-readable medium described above may further include processes, features, means, or instructions for identifying a time window around the first time. Some examples of the method, apparatus, and non-transitory computer-readable medium described above may further include processes, features, means, or instructions for determining the subset of the set of available resources as remaining resources within the time window. In some examples of the method, apparatus, and non-transitory computer-readable medium described above, the selecting the second resource comprises randomly selecting the second resource from the subset of the set of available resources.

In some examples of the method, apparatus, and non-transitory computer-readable medium described above, the time window may be configured by a base station. In some examples of the method, apparatus, and non-transitory computer-readable medium described above, the time window comprises a predetermined fixed time window.

Some examples of the method, apparatus, and non-transitory computer-readable medium described above may further include processes, features, means, or instructions for determining that the subset of the set of available resources for transmitting the second transmission may be empty. Some examples of the method, apparatus, and non-transitory computer-readable medium described above may further include processes, features, means, or instructions for skipping the selecting the second resource and transmitting the second transmission.

Some examples of the method, apparatus, and non-transitory computer-readable medium described above may further include processes, features, means, or instructions for determining that the subset of the set of available resources for transmitting the second transmission may be empty. Some examples of the method, apparatus, and non-transitory computer-readable medium described above may further include processes, features, means, or instructions for modifying the candidate set of resources to include additional resources of the set of available resources such that the subset of the set of available resources may be non-empty.

In some examples of the method, apparatus, and non-transitory computer-readable medium described above, the candidate set of resources may be identified as resources of the set of available resources having a received energy that may be below a threshold value, and wherein the modifying comprises increasing the threshold value until the subset of the set of available resources may be non-empty.

In some examples of the method, apparatus, and non-transitory computer-readable medium described above, the first resource may be selected randomly from the candidate set of resources.

In some examples of the method, apparatus, and non-transitory computer-readable medium described above, the D2D transmission comprises a sidelink transmission between two D2D UE devices, and therein the set of available resources may be primary sidelink shared channel (PSSCH) resources.

In some examples of the method, apparatus, and non-transitory computer-readable medium described above, the set of available resources comprises a subset of a configured set resources available for D2D transmissions, and may be identified based at least in part on one or more SAs associated with one or more D2D transmitters.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
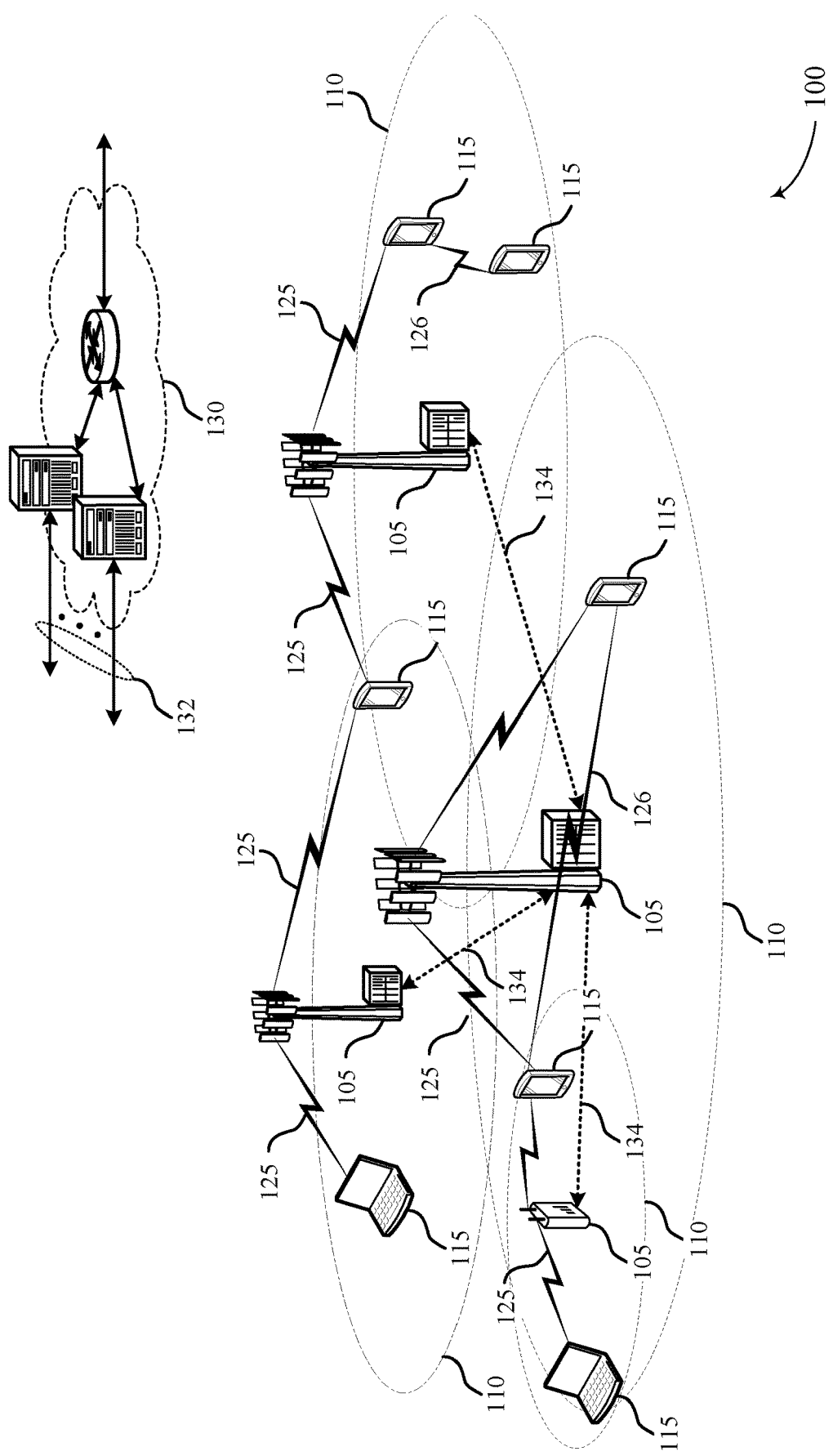
FIG. 1 illustrates an example of a system for wireless communication that supports autonomous resource selection for multiple transmissions in D2D communication in accordance with various aspects of the present disclosure.

Some wireless systems may support device-to-device (D2D) communication among devices, which may enable user equipment (UEs) to communicate directly with each other without an intermediate connection to a central device, such as a base station. Systems may support D2D communications by, for example, employing a pattern known or recognized by devices within the system. In D2D, one UE may be known as a transmitting UE and another UE may be known as a receiving UE. In some cases, a D2D structure for communication among UEs may include control information signaled by a base station. For example, a transmitting UE may receive downlink control information (DCI) from a base station, and the DCI may include control information—including a set of configured resources for use by D2D devices for D2D communications—that supports D2D communication with a receiving UE. The transmitting UE may send sidelink control information (SCI) to a receiving UE configured by higher layers to monitor for this information. After configuration of data transmission, a transmitting UE may transmit using a primary sidelink shared channel (PSSCH). Resource block allocation may come from the original DCI format grant and may be replicated in SCI format grant from the transmitting UE. The receiving UE may configure PSSCH based on reception of SCI.

In some cases, it may be desired for the D2D communications to have relatively high reliability, such that any receiving UEs are highly likely to successfully receive and decode a D2D transmission from a transmitting UE. In many traditional systems, a hybrid acknowledgment receipt request (HARQ) process may provide a relatively high reliability, and a receiving UE may provide acknowledgment feedback to a transmitting UE to indicate successful receipt of a transmission. If a transmission is not successfully received, the transmitting UE may retransmit the transmission. Various aspects of the present disclosure provide that a transmitting UE may transmit a blind HARQ transmission, in which a D2D transmission may be retransmitted without receiving a negative acknowledgment of the original transmission. Such blind HARQ transmissions may provide an increased likelihood that a receiving UE will successfully receive a transmission.

In some examples, UEs of a D2D system may autonomously select resources for D2D transmissions, such as PSSCH transmissions. A number of UEs may be configured with D2D resources by a serving base station. One or more UEs may transmit scheduling assignment (SA) information, indicating resources of the configured resources that are being used for D2D transmissions. A transmitting UE may identify available D2D resources for transmitting a D2D transmission based on the configured resources and the SA information of the one or more other UEs. The transmitting UE may identify a resource for a first transmission of a D2D transmission from the available D2D resources, and may identify a second resource for a second transmission of the D2D transmission. The second transmission may be, for example, a blind HARQ transmission that may be transmitted to enhance the likelihood that one or more receiving UEs successfully receive the transmission. In some examples, the second resource may be identified based on other available resources within a predetermined time window around the first transmission. In some cases, the transmitting UE may identify a candidate set of resources within the set of available resources, that may be identified based on, for example, a ranking of available resources based on total received energy (e.g., to reduce potential interference of other transmitting UEs). In some case, the resources for the blind HARQ transmission may be selected randomly from any remaining resources of the candidate set of resources (e.g., remaining resources within the candidate set that are pruned based on the time window).

In some cases, the transmitting UE may determine that there are no remaining resources of the candidate set of resources, and the blind HARQ transmission may be skipped, or an alternative resource may be identified for the blind HARQ transmission. In some examples, the alternative resource may be determined by randomly selecting a remaining resource of the available D2D resources. In other examples, the alternative resource may be determined by modifying the candidate set of resources until a resource is available for the blind HARQ transmission (e.g., by modifying a received energy threshold of the candidate set of resources).

Aspects of the disclosure discussed above are further described below in the context of a wireless communication system. Specific examples are then described for resource selection for D2D transmissions and blind HARQ transmissions. These and other aspects of the disclosure are further illustrated by and described with reference to apparatus diagrams, system diagrams, and flowcharts that relate to low latency D2D communication.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support D2D communications between one or more UEs 115. For example, UEs 115 may autonomously select resources for multiple D2D transmissions according to techniques provided herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication links 126, which may be referred to as sidelinks, may also be established between UEs 115 in a D2D communications configuration. One or more of a group of UEs 115 utilizing D2D communications may be within the geographic coverage area 110 of a cell.

Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105 using autonomous resource selection.

As indicated above, in some cases UEs 115 may autonomously select resources for D2D transmissions. In such cases, a transmitting UE 115 may identify available D2D resources for transmitting a D2D transmission based on, for example, configured D2D resources (e.g., resources configured for D2D transmission by a base station 105) and SA information of the one or more other UEs 115. In some examples, a UE 115 may identify a first resource for transmitting a D2D transmission, and may identify a second resource for transmitting a blind HARQ transmission for the D2D transmission. Various aspects of the present disclosure provide techniques for the identification and selection of resources to be used for multiple D2D transmissions, such as a first D2D transmission and an associated blind HARQ transmission.

Figure 2:
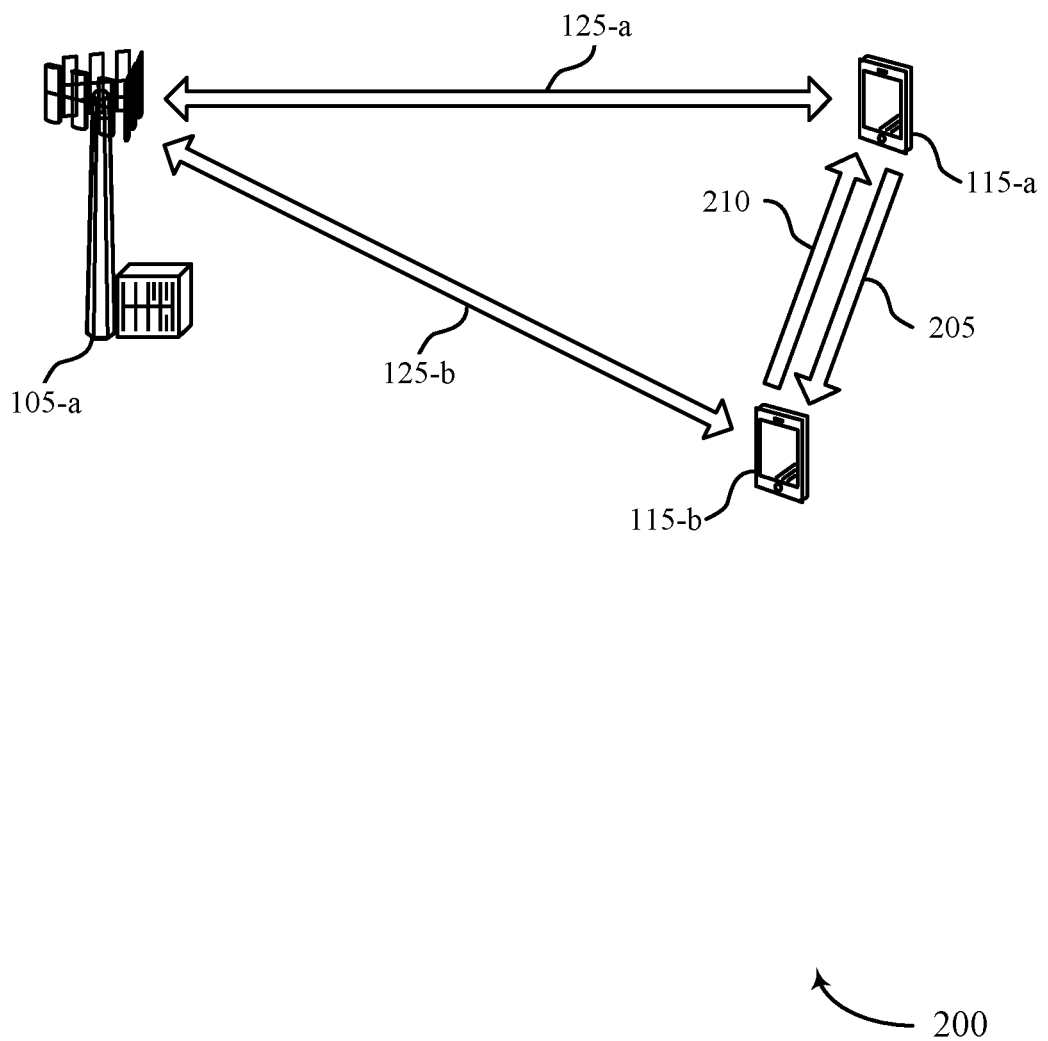
FIG. 2 illustrates an example of a wireless communications system that supports autonomous resource selection for multiple transmissions in D2D communication in accordance with various aspects of the present disclosure.

FIG. 2 illustrates an example of a wireless communications system 200 for autonomous resource selection for multiple transmissions in D2D communications in accordance with various aspects of the present disclosure. Wireless communications system 200 may include a UE 115-a and base station 105-a, which may be examples of a UE 115 base station 105 described with reference to FIG. 1. Wireless communications system 200 may support D2D communication and peer-to-peer communication between UE 115-a and UE 115-b. UE 115-a may be referred to as a transmitting UE and UE 115-b may be referred to as a receiving UE. UE 115-a may be coupled with base station 105-a by communication link 125-a. In some cases, UE 115-b may be communicate with base station 105-a through communication link 125-b. UE 115-a may configured to perform D2D communications with UE 115-b through sidelink 205. In some cases, UE 115-b may transmit to UE 115-a through sidelink 210.

Establishing a D2D connection may include a discovery process and a synchronization process. By way of example, the discovery process includes configuration of user timing or periodicity of discovery periods, payload content and sizing, and structure of subframe-based Tx/Rx resource pools. In some examples, UE 115-a may receive DCI and may transmit a physical sidelink control channel (PSCCH) transmission to UE 115-b. Resources for PSCCH may be configured using information communicated from base station 105-a and conveyed between UEs 115 with higher layer signaling. The PSCCH payload may be sent based on autonomous resource selection by transmitting UE 115-b. The PSCCH may contain SCI format payload contents which may not include a destination ID specifying intended receiving UEs, but may include, for example, frequency resource allocation, hopping enabled flag, time allocation bitmask, master control system (MCS) and timing advance (e.g., UE 115 sets may be based on its uplink timing), and cyclic redundancy check (CRC) information. In some cases, the above information may be copied from a DCI format grant.

In some examples, UEs 115 may perform autonomous selection of resources to use for D2D transmissions. In some examples, resources may be selected by a UE 115 for a PSSCH transmission autonomously. In some cases, all PSCCH/PSSCH transmissions may have a same priority, and all of the resources configured by base station 105-a may be considered as being available for D2D transmissions. A UE 115 may exclude some resources based at least in part on SAs of other UEs 115, and identify a set of available resources. In some examples, a configured resource may be excluded from the set of available resources if it is indicated or reserved by a decoded SA and a received demodulation reference signal (DMRS) power in the associated data resource is above a threshold. The transmitting UE 115 may then determine a candidate set of resources. The candidate set of resources may be determined, in some examples, by measuring and ranking the available PSSCH resources based on total received energy, and selecting a subset based on a received energy threshold. The transmitting UE 115 may then select a resource for a D2D transmission randomly from the candidate set of resources.

In cases where the transmitting UE 115 is to transmit a blind HARQ transmission of the D2D transmission, some examples may provide that the UE 115 may select a second resource randomly from the remaining candidate resources that that satisfy a time-domain constraint around the first selected D2D resource (e.g. within +/− X ms). In some examples, the transmitting UE 115 may autonomously select the second resource by pruning the subset of candidate resources to a smaller subset to include the resources that occur within X ms of the first selected resource. In some cases, the value of X may be configured in a communications standard. In some cases, the value of X may be set by the base station 105 to be a predetermined value, such as +/−7 ms or +/−8 ms from the first selected resource. In cases where the pruned subset is non-empty, the transmitting UE 115 may randomly select the second resource from the pruned subset and use the second resource for transmission of a blind-HARQ transmission. In cases where the pruned subset is empty, the transmitting UE 115 may transmit the first transmission on the first resource, and not transmit the blind-HARQ retransmission. Alternatively, in cases where the pruned subset is empty, the transmitting UE may randomly select a second resource within X ms of the first selected resource from the original set of available resources. In other examples, the transmitting UE may increase the size of the candidate set of resources to be a larger subset (e.g., by increasing the value of the received energy threshold) until a non-empty subset is obtained, and the second resource may be randomly selected from the now non-empty subset.

Figure 3:
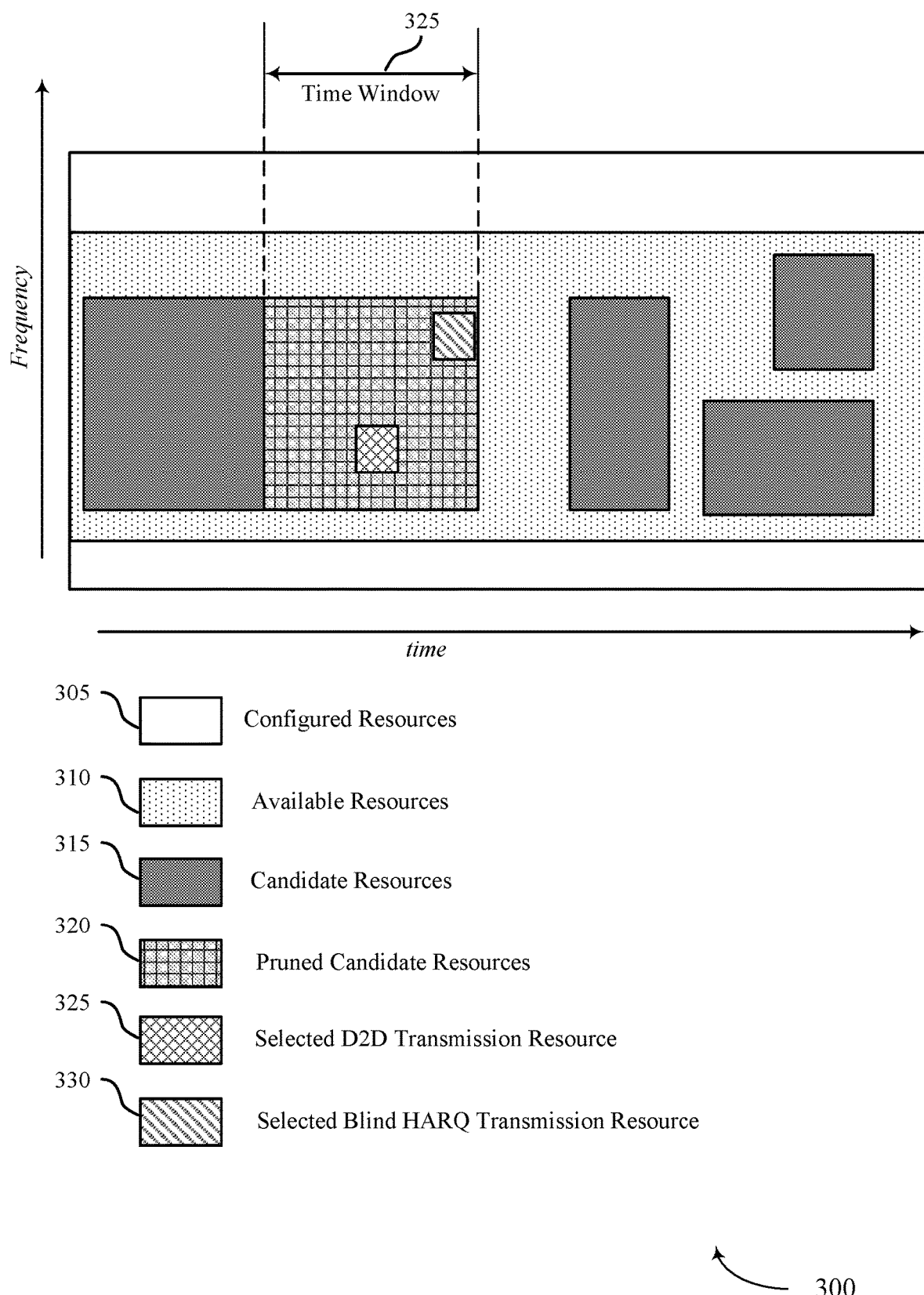
FIG. 3 illustrates an example of wireless resources that support autonomous resource selection for multiple transmissions in D2D communication in accordance with various aspects of the present disclosure.

FIG. 3 illustrates an example of D2D resources 300 for autonomous resource selection for multiple transmissions in D2D communications in accordance with various aspects of the present disclosure. As indicated above, a UE, such as a UE 115 of FIGS. 1-2, may autonomously select D2D resources for multiple D2D transmissions. In this example, a set of configured resources 305 may be configured for D2D transmissions. A set of available resources 310 may be identified, such as by identifying available resources that have not been identified in SAs of one or more other UEs. A candidate set of resources 315 may include, as discussed above, resources of the available resources that have a received energy below a threshold value, for example. A first D2D transmission resource 325 may be selected from the candidate resources 315. The candidate resources 315 may then be pruned to obtain a subset of pruned candidate resources 320 that are within, for example, a predetermined time window 325 of the selected D2D transmission resource 325. Selected blind HARQ transmission resource 330 may be, for example, randomly selected from the pruned candidate resources 320. While this example illustrates the blind HARQ transmission resource 330 after the selected D2D transmission resource 325 in time, other examples may result in the blind HARQ transmission resource 330 starting before the selected D2D transmission resource 325 in time. Furthermore, while various subsets of resources are illustrated as being contiguous in frequency and time, such resources may be non-contiguous in frequency, time, or both.

Figure 4:
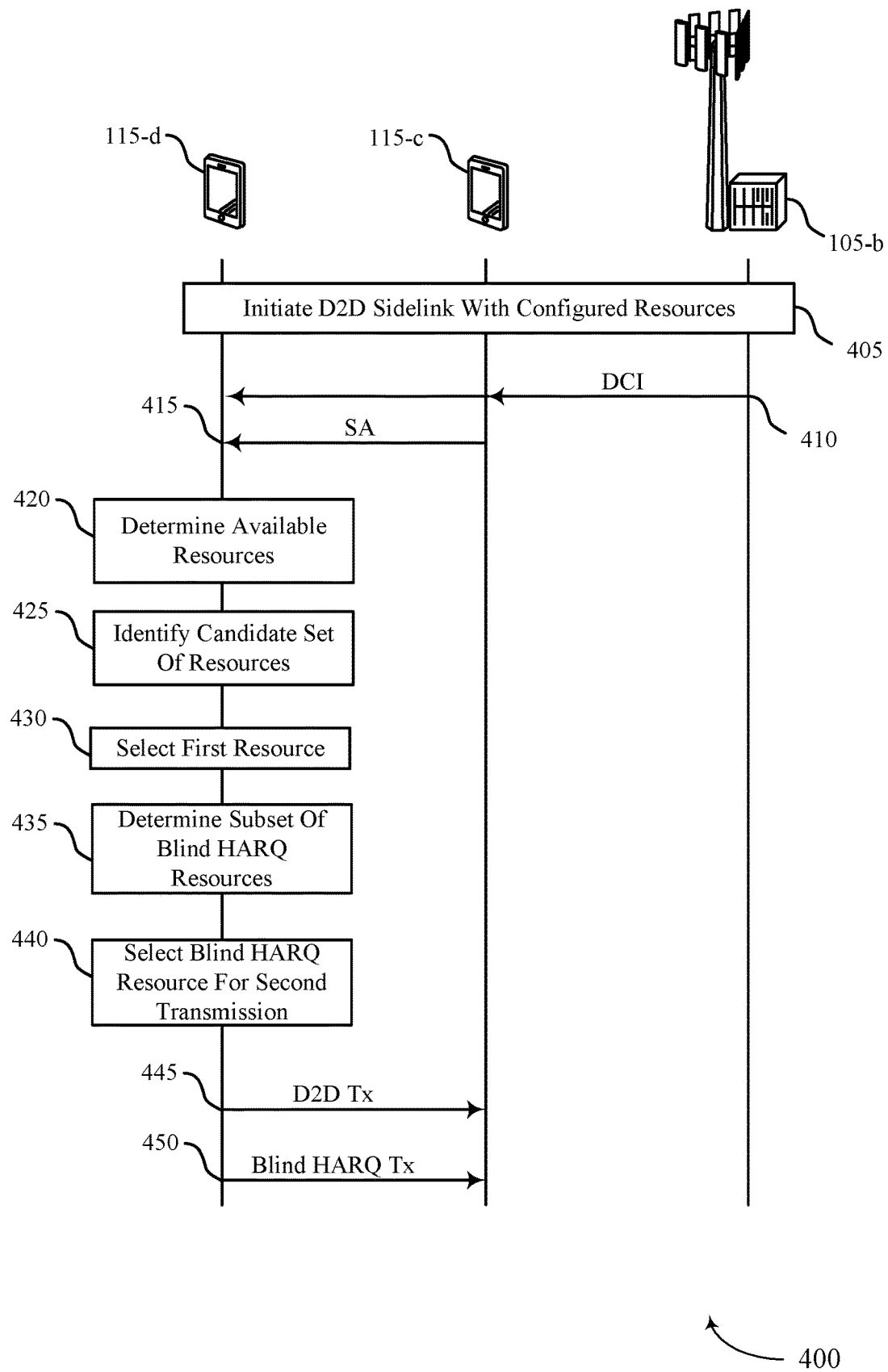
FIG. 4 illustrates an example of a process flow that supports autonomous resource selection for multiple transmissions in D2D communication in accordance with various aspects of the present disclosure.

FIG. 4 illustrates an example of a process flow 400 for autonomous resource selection for multiple transmissions in D2D communications in accordance with various aspects of the present disclosure. Process flow 400 may include a UE 115-*c*, a UE 115-*d*, and base station 105-*b*, which may be examples of a UE 115 and base station 105 described with reference to FIGS. 1-2. UE 115-*d* may be known as a transmitting UE and UE 115-*c* may be known as a receiving UE. UE 115-*c* and 115-*d* may communicate directly over a sidelink configured for autonomous resource selection by UEs 115. UE 115-*c* may receive DCI from base station 105-*b* and may then send a SA to UE 115-*d* based on the received DCI. UE 115-*d* may transmit multiple D2D transmissions to multiple other UEs, including UE 115-*c*.

At 405, UE 115-*c*, UE 115-*d*, and base station 105-*b* may initiate a D2D sidelink, and the base station 105-*b* may configure a configured set of resources that are available for autonomous resource selection by UEs 115. Base station 105-*b* may transmit a sidelink initiation signal to UE 115-*c* and to UE 115-*d*. In some examples, the sidelink initiation signal may indicate that the sidelink communications are broadcast communications transmitted from a transmitting UE 115 to multiple receiving UEs 115. In such cases, the UEs 115 may be configured to autonomously determine resources for D2D transmissions. The base station 105-*b* may additionally or alternatively configure blind HARQ transmissions by the UEs 115.

At 410, base station 105-*b* may send DCI to UE 115-*c* and UE 115-*d*. At 415, UE 115-*c* may send a SA to UE 115-*d*. UE 115-*d* may identify the SA and use information therein to determine a set of available resources for D2D transmissions, according to block 420.

At block 425, the UE 115-*d* may identify a candidate set of resources, which may be based on resources of the set of available resources that meet some criteria, such as that have a received energy level below a threshold value. The UE 115-*d* may then select a first resource from the candidate set of resources, as indicated at 430. Such a selection may be a random selection of a resource from the candidate set of resources.

At block 435, the UE 115-*d* may determine a subset of the set of available resources to identify blind HARQ resources. Such a determination may be made based on, for example, remaining resources of the candidate set of resources that are within a predetermined time period of the selected first resource.

At block 440, the UE 115-*d* may select a second resource as a blind HARQ resource for a second transmission such as a blind HARQ transmission. The selection of the second resource may be, for example, a random selection of a resource from the subset of the set of available resources. The UE 115-*d* may then transmit the D2D transmission 445 using the first resource, and may transmit the blind HARQ transmission 450 using the second resource. In some examples, the second resource may have a later or earlier starting point in time than the first resource.

Figure 5:
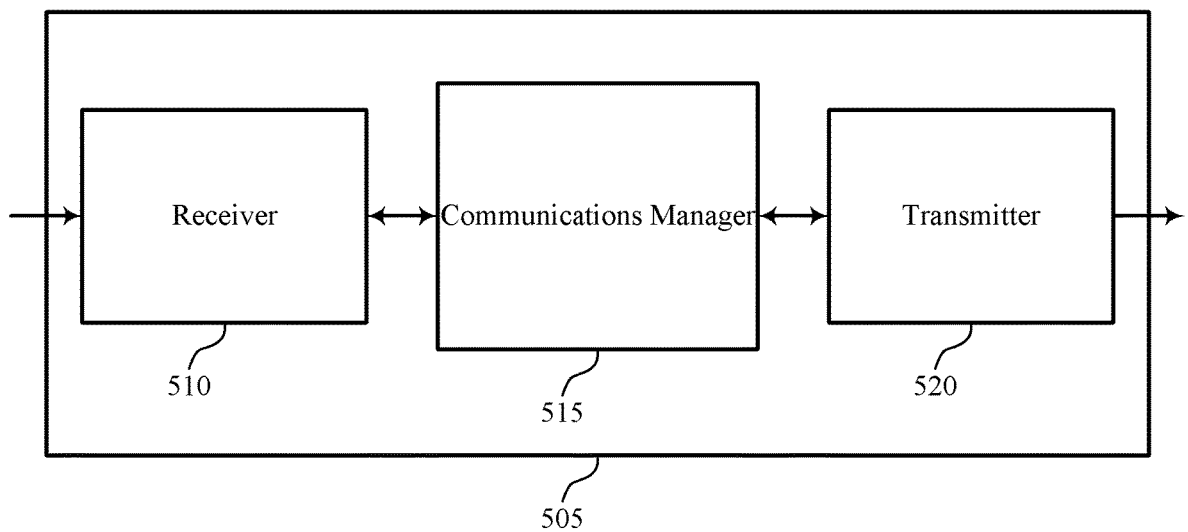
FIGS. 5 through 7 show block diagrams of a device that supports autonomous resource selection for multiple transmissions in D2D communications in accordance with various aspects of the present disclosure.

FIG. 5 shows a block diagram 500 of a wireless device 505 that supports autonomous resource selection for multiple transmissions in D2D communications in accordance with various aspects of the present disclosure. Wireless device 505 may be an example of aspects of a UE 115 as described with reference to FIG. 1. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to autonomous resource selection for multiple transmissions in D2D communications, etc.). Information may be passed on to other components of the device. The receiver 510 may be an example of aspects of the transceiver 835 described with reference to FIG. 8.

Communications manager 515 may be an example of aspects of the communications manager 815 described with reference to FIG. 8.

Communications manager 515 may identify a candidate set of resources within a set of available resources for transmitting a D2D transmission, select a first resource within the candidate set of resources for transmitting a first transmission of the D2D transmission, determine a subset of the set of available resources for transmitting a second transmission of the D2D transmission, select a second resource within the subset of the set of available resources for transmitting the second transmission, transmit the first transmission using the first resource, and transmit the second transmission using the second resource.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
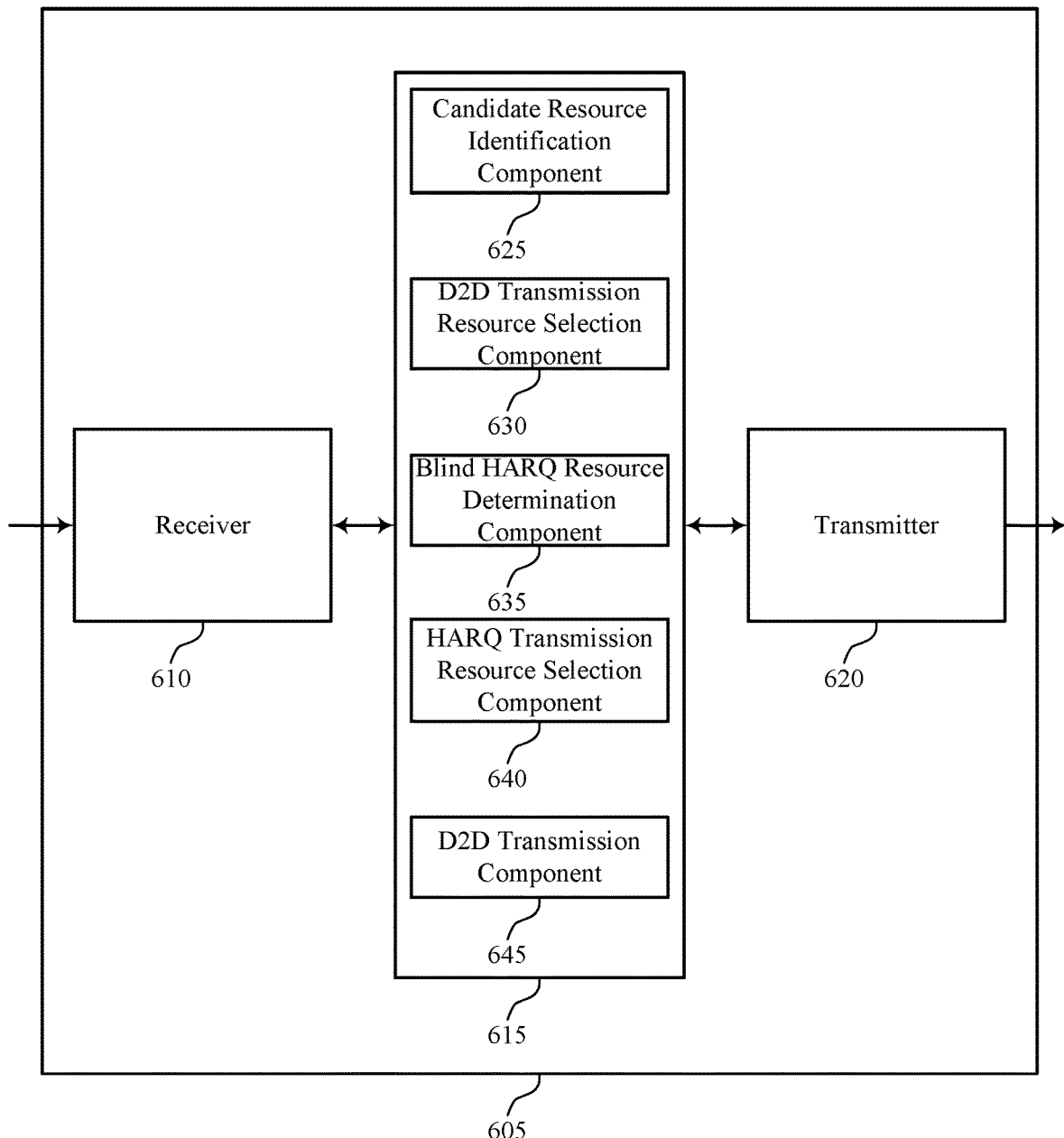

FIG. 6 shows a block diagram 600 of a wireless device 605 that supports autonomous resource selection for multiple transmissions in D2D communications in accordance with various aspects of the present disclosure. Wireless device 605 may be an example of aspects of a wireless device 505 or a UE 115 as described with reference to FIGS. 1 and 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to autonomous resource selection for multiple transmissions in D2D communications, etc.). Information may be passed on to other components of the device. The receiver 610 may be an example of aspects of the transceiver 835 described with reference to FIG. 8.

Communications manager 615 may be an example of aspects of the communications manager 815 described with reference to FIG. 8. Communications manager 615 may also include candidate resource identification component 625, D2D transmission resource selection component 630, blind HARQ resource determination component 635, HARQ transmission resource selection component 640, and D2D transmission component 645.

Candidate resource identification component 625 may identify a candidate set of resources within a set of available resources for transmitting a D2D transmission. In some cases, if the subset of available resources for transmitting the second transmission is empty, the candidate resource identification component 625 may modify the candidate set of resources to include additional resources of the set of available resources such that the subset of the set of available resources is non-empty. In some cases, the candidate set of resources is identified as resources of the set of available resources having a received energy that is below a threshold value. In some cases, the modifying includes increasing the threshold value until the subset of the set of available resources is non-empty. In some cases, the set of available resources includes a subset of a configured set resources available for D2D transmissions, and is identified based on one or more SAs associated with one or more D2D transmitters.

D2D transmission resource selection component 630 may select a first resource within the candidate set of resources for transmitting a first transmission of the D2D transmission. In some cases, the first resource is selected randomly from the candidate set of resources.

Blind HARQ resource determination component 635 may determine a subset of the set of available resources for transmitting a second transmission of the D2D transmission. In some cases, the blind HARQ resource determination component 635may determine that the subset of the set of available resources for transmitting the second transmission is empty, and skip the selecting the second resource and transmitting the second transmission. In some cases, the subset of the set of available resources is determined based on remaining resources of the candidate set of resources after removing the first resource from the candidate set of resources.

HARQ transmission resource selection component 640 may select a second resource within the subset of the set of available resources for transmitting the second transmission. In some cases, the selecting the second resource includes randomly selecting the second resource from the subset of the set of available resources.

D2D transmission component 645 may cause transmission of the first transmission using the first resource and the second transmission using the second resource.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
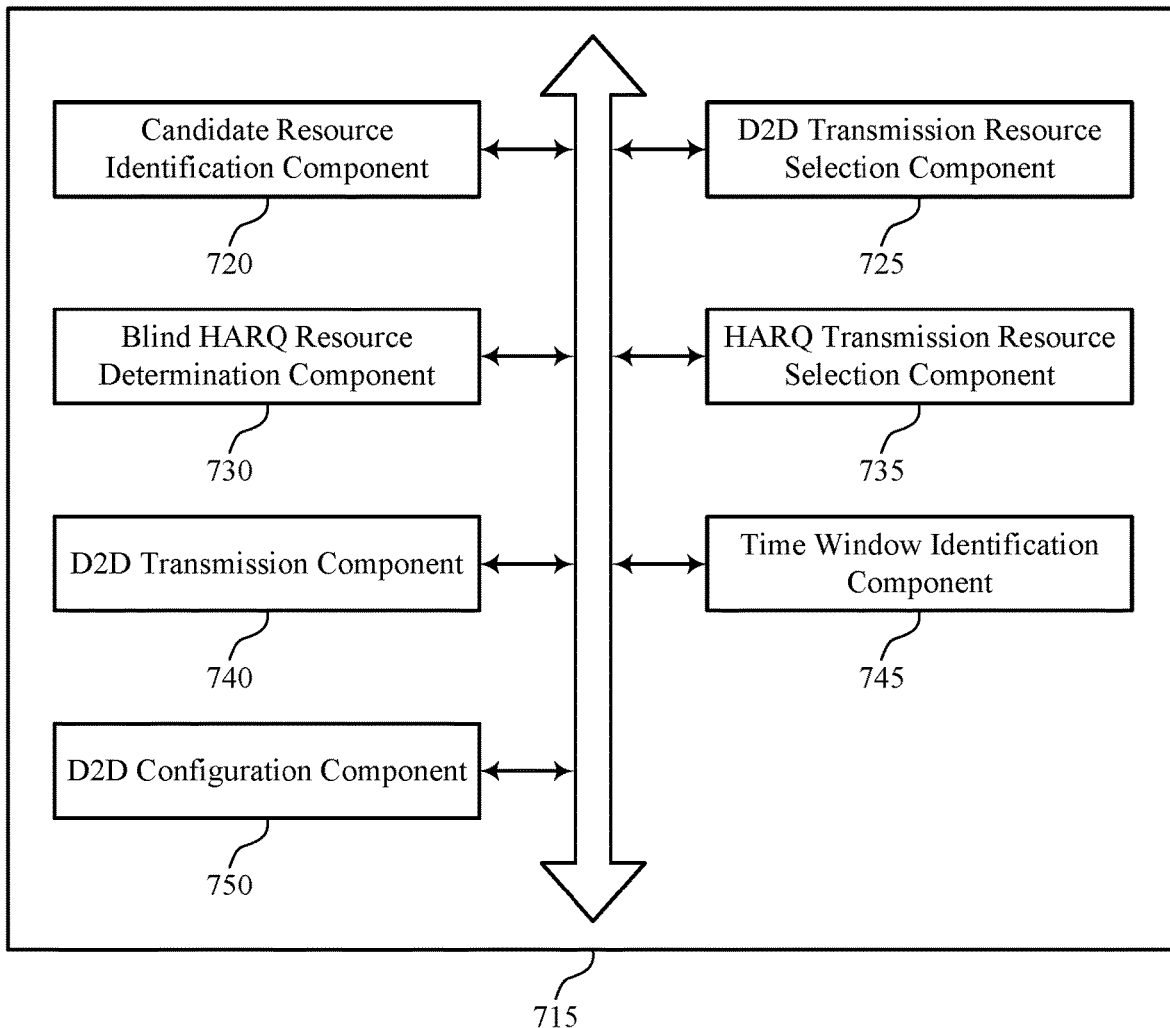

FIG. 7 shows a block diagram 700 of a communications manager 715 that supports autonomous resource selection for multiple transmissions in D2D communications in accordance with various aspects of the present disclosure. The communications manager 715 may be an example of aspects of a communications manager 515, a communications manager 615, or a communications manager 815 described with reference to FIGS. 5, 6, and 8. The communications manager 715 may include candidate resource identification component 720, D2D transmission resource selection component 725, blind HARQ resource determination component 730, HARQ transmission resource selection component 735, D2D transmission component 740, time window identification component 745, and D2D configuration component 750. Each of these modules may communicate, directly or indirectly, with one another (e.g., via one or more buses).

Candidate resource identification component 720 may identify a candidate set of resources within a set of available resources for transmitting a D2D transmission. In some cases, if the subset of available resources for transmitting the second transmission is empty, the candidate resource identification component 720 may modify the candidate set of resources to include additional resources of the set of available resources such that the subset of the set of available resources is non-empty. In some cases, the candidate set of resources is identified as resources of the set of available resources having a received energy that is below a threshold value. In some cases, the modifying includes increasing the threshold value until the subset of the set of available resources is non-empty. In some cases, the set of available resources includes a subset of a configured set resources available for D2D transmissions, and is identified based on one or more SAs associated with one or more D2D transmitters.

D2D transmission resource selection component 725 may select a first resource within the candidate set of resources for transmitting a first transmission of the D2D transmission. In some cases, the first resource is selected randomly from the candidate set of resources.

Blind HARQ resource determination component 730 may determine a subset of the set of available resources for transmitting a second transmission of the D2D transmission. In some cases, the blind HARQ resource determination component 730 may determine that the subset of the set of available resources for transmitting the second transmission is empty, and skip the selecting the second resource and transmitting the second transmission. In some cases, the subset of the set of available resources is determined based on remaining resources of the candidate set of resources after removing the first resource from the candidate set of resources.

HARQ transmission resource selection component 735 may select a second resource within the subset of the set of available resources for transmitting the second transmission. In some cases, the selecting the second resource includes randomly selecting the second resource from the subset of the set of available resources.

D2D transmission component 740 may cause transmission of the first transmission using the first resource and the second transmission using the second resource.

Time window identification component 745 may identify a time window around the first time and determine the subset of the set of available resources as remaining resources within the time window. In some cases, the determining the subset of the set of available resources additionally or alternatively includes identifying a first time for transmitting the first transmission.

D2D configuration component 750 may receive D2D configuration information form a base station. In some cases, the time window is configured by the base station. In some cases, the time window includes a predetermined fixed time window. In some cases, the D2D transmission includes a sidelink transmission between two D2D UE devices, and the set of available resources are PSSCH resources.

Figure 8:
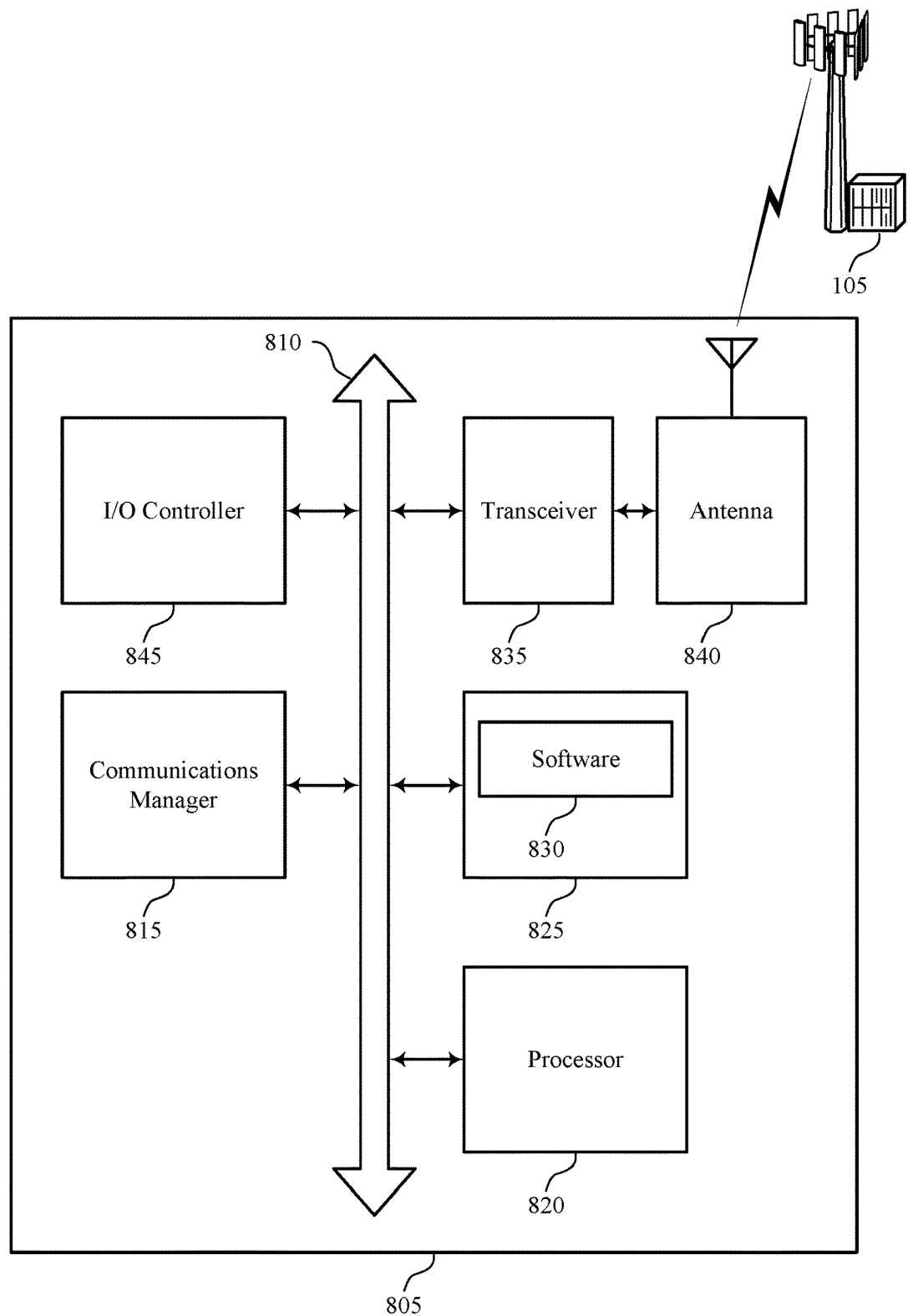
FIG. 8 illustrates a block diagram of a system including a UE that supports autonomous resource selection for multiple transmissions in D2D communications in accordance with various aspects of the present disclosure.

FIG. 8 shows a diagram of a system 800 including a device 805 that supports autonomous resource selection for multiple transmissions in D2D communications in accordance with various aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting autonomous resource selection for multiple transmissions in D2D communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support autonomous resource selection for multiple transmissions in D2D communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
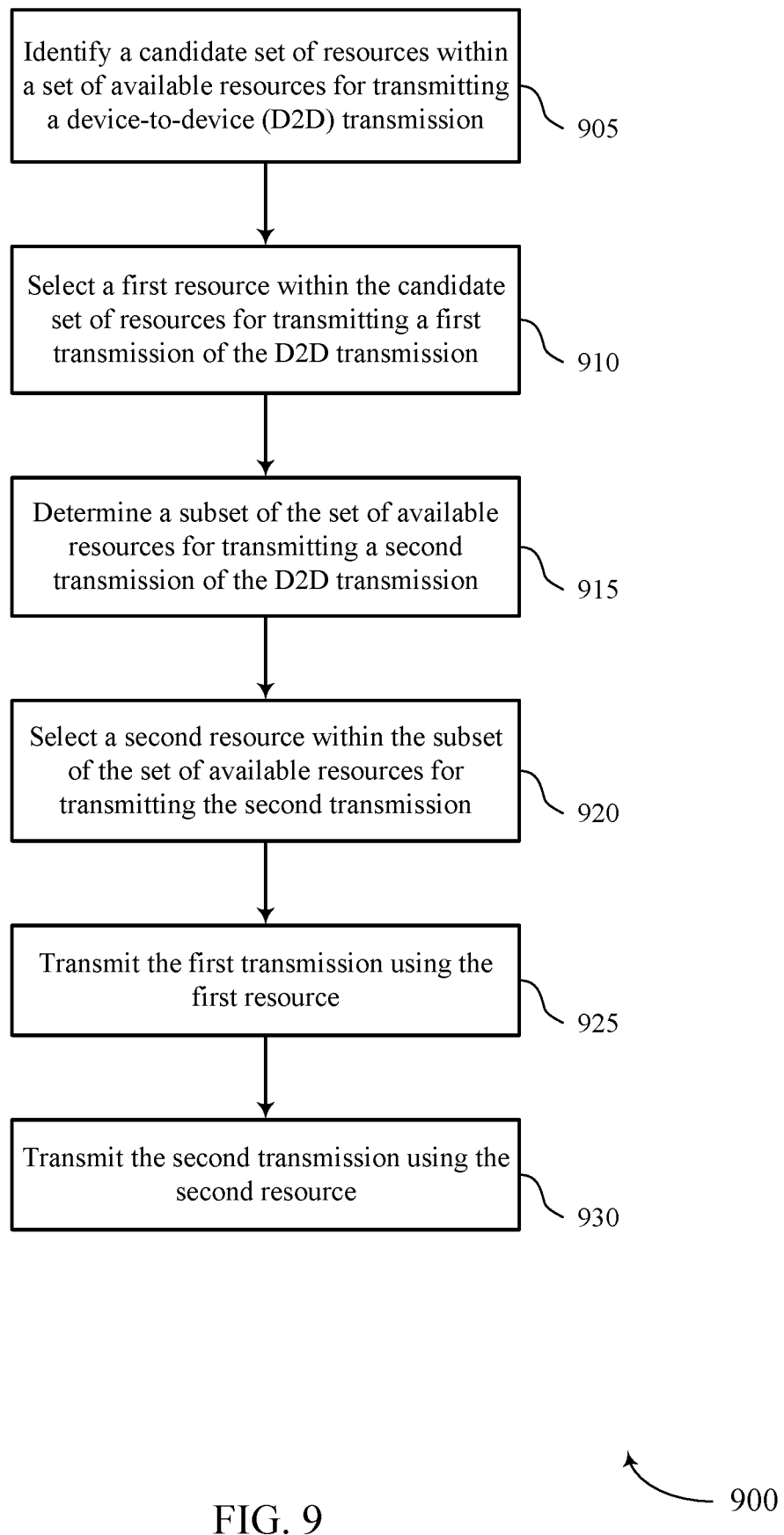
FIGS. 9 through 11 illustrate methods for autonomous resource selection for multiple transmissions in D2D communications in accordance with various aspects of the present disclosure.

FIG. 9 shows a flowchart illustrating a method 900 for autonomous resource selection for multiple transmissions in D2D communications in accordance with various aspects of the present disclosure. The operations of method 900 may be implemented by a UE 115 or its components as described herein. For example, the operations of method 900 may be performed by a communications manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 905 the UE 115 may identify a candidate set of resources within a set of available resources for transmitting a D2D transmission. The operations of block 905 may be performed according to the methods described with reference to FIGS. 1 through 4. In some examples, aspects of the operations of block 905 may be performed by a candidate resource identification component as described with reference to FIGS. 5 through 8.

At block 910 the UE 115 may select a first resource within the candidate set of resources for transmitting a first transmission of the D2D transmission. The operations of block 910 may be performed according to the methods described with reference to FIGS. 1 through 4. In some examples, aspects of the operations of block 910 may be performed by a D2D transmission resource selection component as described with reference to FIGS. 5 through 8.

At block 915 the UE 115 may determine a subset of the set of available resources for transmitting a second transmission of the D2D transmission. The operations of block 915 may be performed according to the methods described with reference to FIGS. 1 through 4. In some examples, aspects of the operations of block 915 may be performed by a blind HARQ resource determination component as described with reference to FIGS. 5 through 8.

At block 920 the UE 115 may select a second resource within the subset of the set of available resources for transmitting the second transmission. The operations of block 920 may be performed according to the methods described with reference to FIGS. 1 through 4. In some examples, aspects of the operations of block 920 may be performed by a HARQ transmission resource selection component as described with reference to FIGS. 5 through 8.

At block 925 the UE 115 may transmit the first transmission using the first resource. The operations of block 925 may be performed according to the methods described with reference to FIGS. 1 through 4. In some examples, aspects of the operations of block 925 may be performed by a D2D transmission component as described with reference to FIGS. 5 through 8.

At block 930 the UE 115 may transmit the second transmission using the second resource. The operations of block 930 may be performed according to the methods described with reference to FIGS. 1 through 4. In some examples, aspects of the operations of block 930 may be performed by a D2D transmission component as described with reference to FIGS. 5 through 8.

Figure 10:
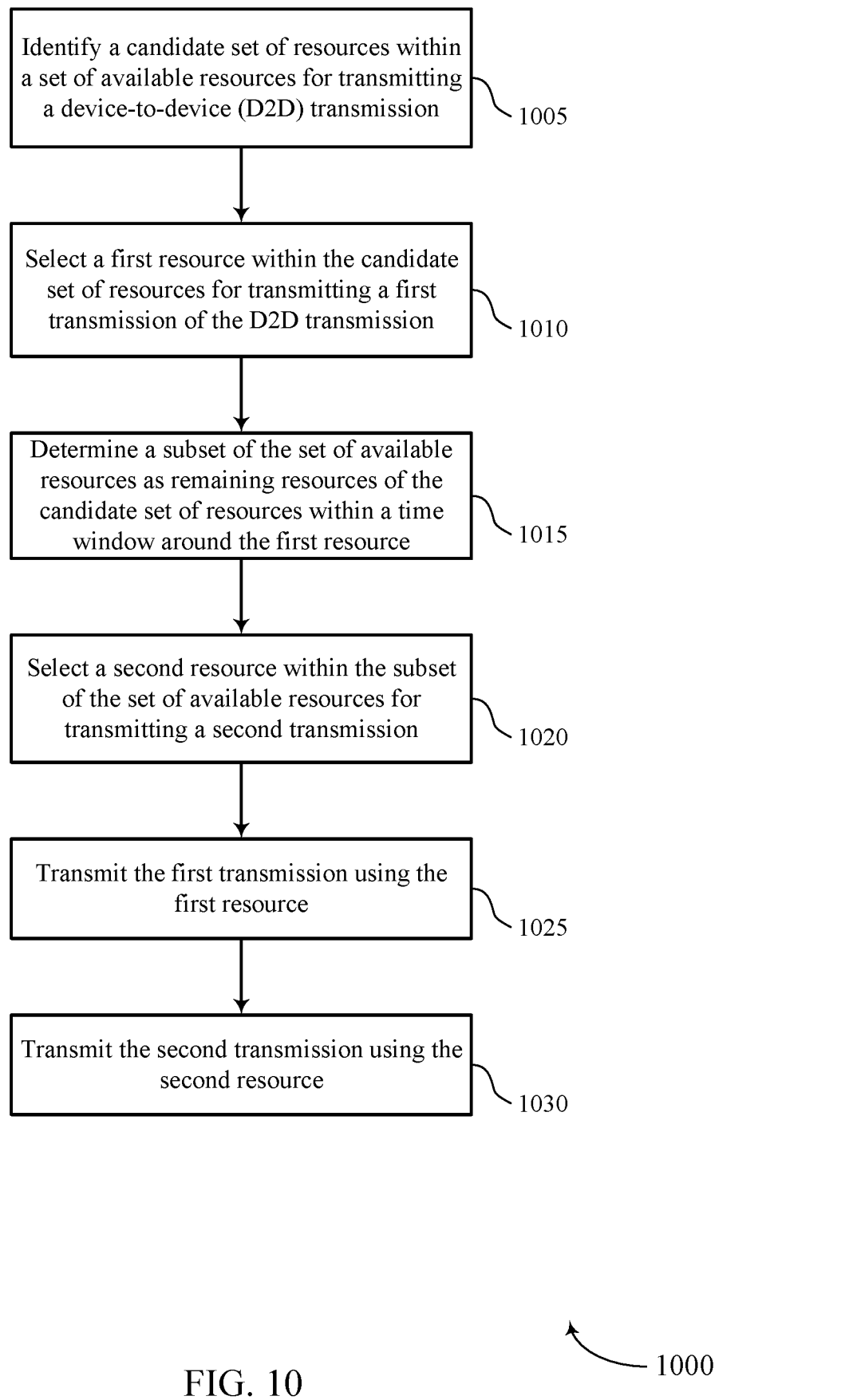

FIG. 10 shows a flowchart illustrating a method 1000 for autonomous resource selection for multiple transmissions in D2D communications in accordance with various aspects of the present disclosure. The operations of method 1000 may be implemented by a UE 115 or its components as described herein. For example, the operations of method 1000 may be performed by a communications manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1005 the UE 115 may identify a candidate set of resources within a set of available resources for transmitting a D2D transmission. The operations of block 1005 may be performed according to the methods described with reference to FIGS. 1 through 4. In some examples, aspects of the operations of block 1005 may be performed by a candidate resource identification component as described with reference to FIGS. 5 through 8.

At block 1010 the UE 115 may select a first resource within the candidate set of resources for transmitting a first transmission of the D2D transmission. The operations of block 1010 may be performed according to the methods described with reference to FIGS. 1 through 4. In some examples, aspects of the operations of block 1010 may be performed by a D2D transmission resource selection component as described with reference to FIGS. 5 through 8.

At block 1015 the UE 115 may determine a subset of the set of available resources as remaining resources of the candidate set of resources within a time window around the first resource. The operations of block 1015 may be performed according to the methods described with reference to FIGS. 1 through 4. In some examples, aspects of the operations of block 1015 may be performed by a blind HARQ resource determination or time window identification components as described with reference to FIGS. 5 through 8.

At block 1020 the UE 115 may select a second resource within the subset of the set of available resources for transmitting the second transmission. The operations of block 1020 may be performed according to the methods described with reference to FIGS. 1 through 4. In some examples, aspects of the operations of block 1020 may be performed by a HARQ transmission resource selection component as described with reference to FIGS. 5 through 8.

At block 1025 the UE 115 may transmit the first transmission using the first resource. The operations of block 1025 may be performed according to the methods described with reference to FIGS. 1 through 4. In some examples, aspects of the operations of block 1025 may be performed by a D2D transmission component as described with reference to FIGS. 5 through 8.

At block 1030 the UE 115 may transmit the second transmission using the second resource. The operations of block 1030 may be performed according to the methods described with reference to FIGS. 1 through 4. In some examples, aspects of the operations of block 1030 may be performed by a D2D transmission component as described with reference to FIGS. 5 through 8.

Figure 11:
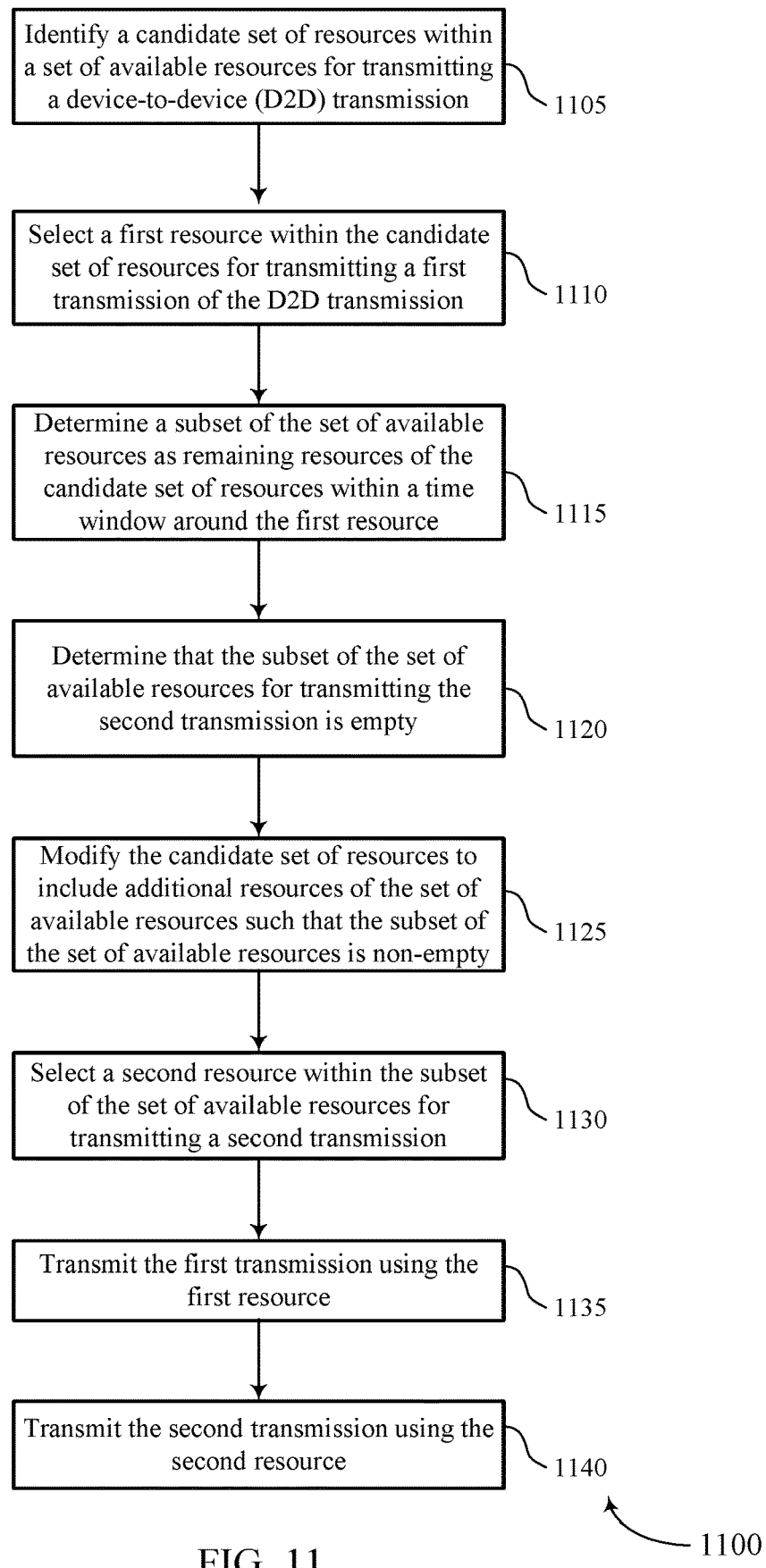

FIG. 11 shows a flowchart illustrating a method 1100 for autonomous resource selection for multiple transmissions in D2D communications in accordance with various aspects of the present disclosure. The operations of method 1100 may be implemented by a UE 115 or its components as described herein. For example, the operations of method 1100 may be performed by a communications manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1105 the UE 115 may identify a candidate set of resources within a set of available resources for transmitting a D2D transmission. The operations of block 1105 may be performed according to the methods described with reference to FIGS. 1 through 4. In some examples, aspects of the operations of block 1105 may be performed by a candidate resource identification component as described with reference to FIGS. 5 through 8.

At block 1110 the UE 115 may select a first resource within the candidate set of resources for transmitting a first transmission of the D2D transmission. The operations of block 1110 may be performed according to the methods described with reference to FIGS. 1 through 4. In some examples, aspects of the operations of block 1110 may be performed by a D2D transmission resource selection component as described with reference to FIGS. 5 through 8.

At block 1115 the UE 115 may determine a subset of the set of available resources as remaining resources of the candidate set of resources within a time window around the first resource. The operations of block 1115 may be performed according to the methods described with reference to FIGS. 1 through 4. In some examples, aspects of the operations of block 1115 may be performed by a blind HARQ resource determination and time window determination components as described with reference to FIGS. 5 through 8.

At block 1120 the UE 115 may determine that the subset of the set of available resources for transmitting the second transmission is empty. The operations of block 1120 may be performed according to the methods described with reference to FIGS. 1 through 4. In some examples, aspects of the operations of block 1120 may be performed by a blind HARQ resource determination component as described with reference to FIGS. 5 through 8.

At block 1125 the UE 115 may modify the candidate set of resources to include additional resources of the set of available resources such that the subset of the set of available resources is non-empty. The operations of block 1125 may be performed according to the methods described with reference to FIGS. 1 through 4. In some examples, aspects of the operations of block 1125 may be performed by a candidate resource identification component as described with reference to FIGS. 5 through 8.

At block 1130 the UE 115 may select a second resource within the subset of the set of available resources for transmitting a second transmission. The operations of block 1130 may be performed according to the methods described with reference to FIGS. 1 through 4. In some examples, aspects of the operations of block 1130 may be performed by a HARQ transmission resource selection component as described with reference to FIGS. 5 through 8.

At block 1135 the UE 115 may transmit the first transmission using the first resource. The operations of block 1135 may be performed according to the methods described with reference to FIGS. 1 through 4. In some examples, aspects of the operations of block 1135 may be performed by a D2D transmission component as described with reference to FIGS. 5 through 8.

At block 1140 the UE 115 may transmit the second transmission using the second resource. The operations of block 1140 may be performed according to the methods described with reference to FIGS. 1 through 4. In some examples, aspects of the operations of block 1140 may be performed by a D2D transmission component as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000, 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    selecting a first resource within candidate resources for transmitting a first device-to-device (D2D) transmission;
    determining remaining resources of the candidate set of resources based at least in part on removing the first resource from the candidate set of resources;
    selecting a second resource, for a second D2D transmission, from the remaining candidate resources after selecting the first resource and within a predetermined fixed time window from the first resource,
        the second transmission being a hybrid acknowledgment feedback, the hybrid acknowledgment feedback indicating successful or unsuccessful receipt of a transmission;
    transmitting the first D2D transmission on the first resource and the second D2D transmission on the second resource,
    the first D2D transmission and the second D2D transmission each comprises a sidelink transmission, the selecting the second resource being randomly selected,
    the second resource for the D2D transmission being after or starting before the selected first resource,
    the 2nd D2D transmission being a retransmission of the acknowledgement feedback without receiving a negative acknowledgement of the first transmission,
    further comprising alternatively skipping the second resources and not transmitting the second D2D transmission.

2. An apparatus for wireless communication, comprising a processor, the processor comprising a combination of intelligent hardware devices;
    memory in electronic communication with the processor; and
    instructions stored in the memory and operable, when executed by the processor, to cause the apparatus to:
    select a first resource within candidate resources for transmitting a first device-to-device (D2D) transmission;
    determine remaining resources of the candidate set of resources based at least in part on removing the first resource from the candidate set of resources;
    select a second resource, for a second D2D transmission, from the remaining candidate resources after selecting the first resource and within a predetermined fixed time window from the first resource,
        the second transmission being a hybrid acknowledgment feedback, the hybrid acknowledgment feedback indicating successful or unsuccessful receipt of a transmission;

transmit the first D2D transmission on the first resource and the second D2D transmission on the second resource,
  the first D2D transmission and the second D2D transmission each comprises a sidelink transmission, the selecting the second resource being randomly selected,
  the second resource for the D2D transmission being after or starting before the selected first resource,
  the 2nd D2D transmission being a retransmission of the acknowledgement feedback without receiving a negative acknowledgement of the first transmission,
the processor being further configured to alternatively skip the second resources and to not transmit the second D2D transmission.

\* \* \* \* \*